April 1, 1958 — W. W. WARREN — 2,828,562
ADVERTISING SIGN MECHANISM
Filed Aug. 2, 1954 — 2 Sheets-Sheet 1
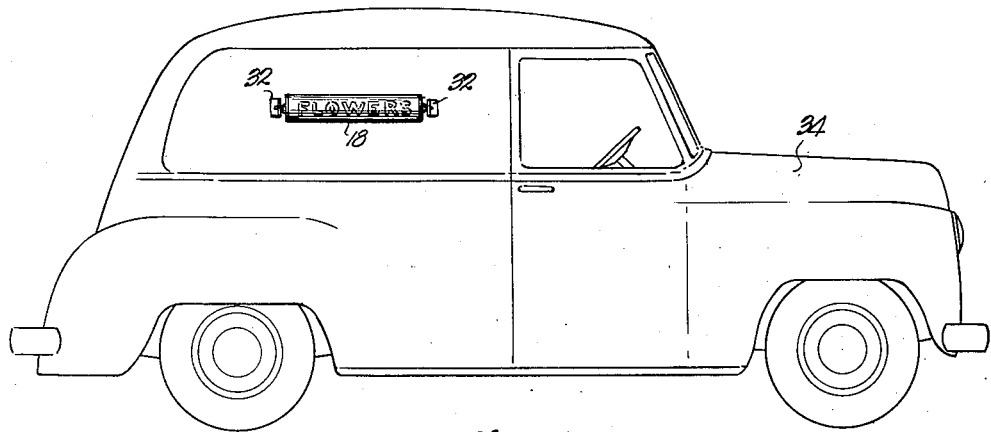
Fig. 1.
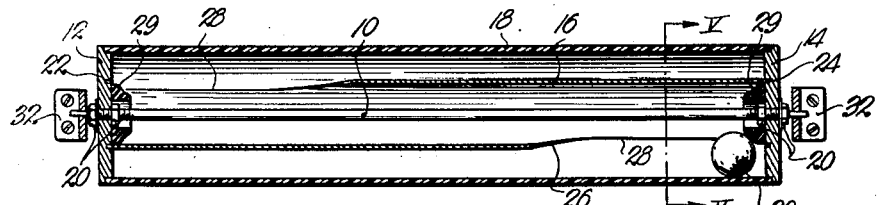
Fig. 2.
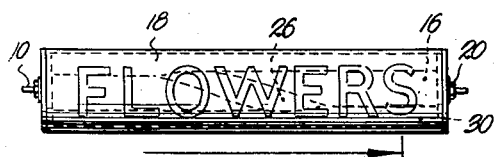
Fig. 3.
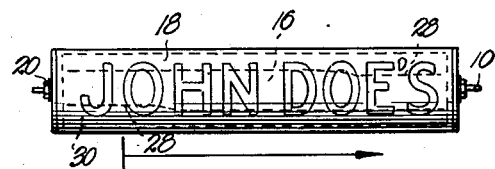
Fig. 4.
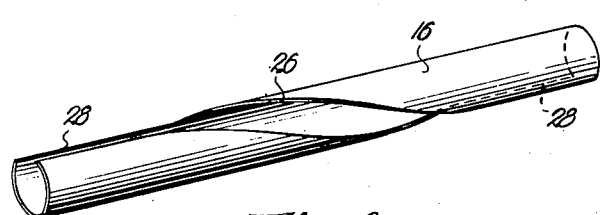
Fig. 6.
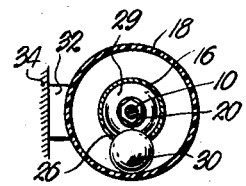
Fig. 5.
INVENTOR.
William W. Warren
BY
ATTORNEY.

April 1, 1958 W. W. WARREN 2,828,562
ADVERTISING SIGN MECHANISM
Filed Aug. 2, 1954 2 Sheets-Sheet 2
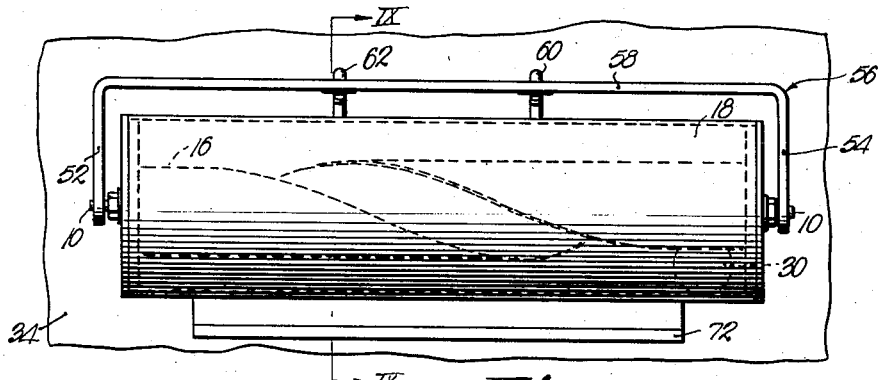
Fig. 7.
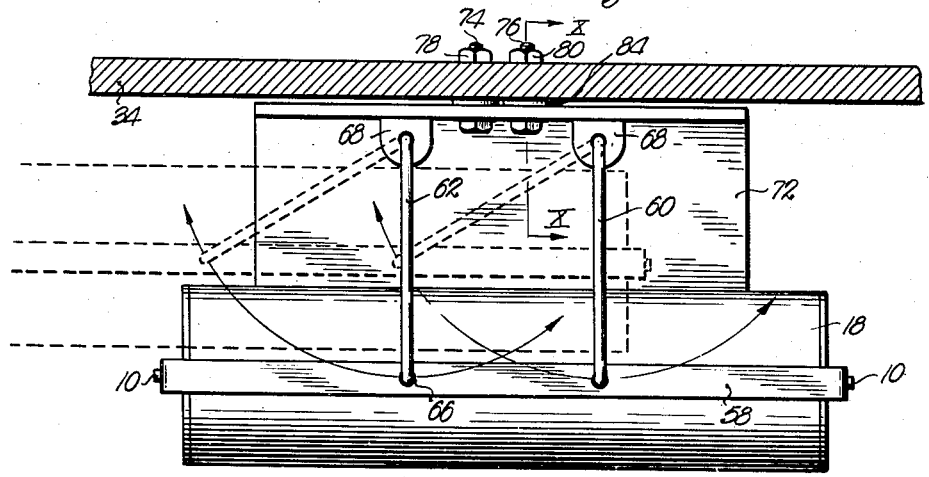
Fig. 8.
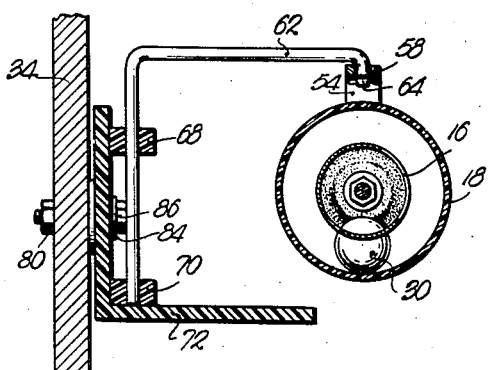
Fig. 9.
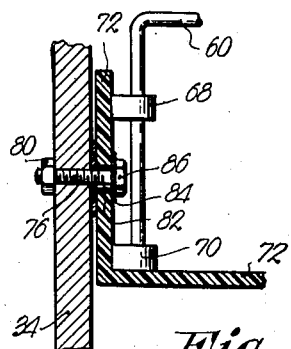
Fig. 10.
INVENTOR.
William W. Warren
BY
ATTORNEY.

United States Patent Office 2,828,562
Patented Apr. 1, 1958

2,828,562
ADVERTISING SIGN MECHANISM

William W. Warren, Joplin, Mo., assignor to Action Devices, Inc., Kansas City, Mo., a corporation of Missouri Application August 2, 1954, Serial No. 447,257

1 Claim. (Cl. 40—68)

This invention relates to the field of advertising, and particularly to a novel display device adapted for use on automobiles, trucks and other self-propelled vehicles.

The primary object of the present invention is the provision of a device having multiple displays thereon, the entire device being shiftable, upon acceleration or deceleration of the vehicle, to alternate the displays.

A further important object of the present invention is to provide a multiple display device wherein the displays also are alternated upon a change of attitude, for example, when the vehicle goes up or down a hill or over bumps and other obstructions in the road.

Another object of the present invention is the provision of an advertising display device adapted for use especially with a moving object and having no apparent connection with any prime mover, a factor which tends to invite the attention and arouse the curiosity of the viewing public as to the manner of operation.

With these and other objects in view, the display device of the present invention generally comprises an elongated member rotatably mounted on the vehicle; structure on the member presenting a spiral ball race; and a ball which rolls in the race when momentum is imparted thereto, the entire device being rotatable by the force of gravity acting on the ball as the latter travels in the ball race.

Other objectives include the provision of mounting brackets which rotatably receive opposed ends of the elongated member; the provision of a short, rectilinear length at each end of the otherwise spiral ball race, which lengths facilitate an initial gain of momentum upon a change of inertia in the ball; the provision of modified mounting means including a pair of arms swingable with each inertia change; and many, more minor objects which will become apparent in the following specification and in the drawing, wherein:

Figure 1 is a side view of a delivery truck having one of the display devices of the present invention mounted thereon.

Fig. 2 is an enlarged, longitudinal, vertical, cross-section of the display device of the present invention.

Fig. 3 is an enlarged, side view of the device illustrated in Fig. 1, showing the display thereon in one position.

Fig. 4 is a side view, similar to Fig. 3, and illustrating the alternate position of the display.

Fig. 5 is a vertical, sectional view taken on line V—V of Fig. 2.

Fig. 6 is an enlarged, perspective view of the inner, tubular body of Fig. 2.

Fig. 7 is an enlarged, side view of the display device of Fig. 1, illustrating a modification of the means for mounting the device.

Fig. 8 is a top, plan view of the device as shown in Fig. 7.

Fig. 9 is a vertical cross-section taken on line IX—IX of Fig. 7; and

Fig. 10 is a transverse cross-section taken on line X—X of Fig. 8.

One use of the advertising display device of the present invention is illustrated in Fig. 1, wherein the device is shown mounted on the panel of a small delivery truck. In the embodiment chosen for illustration, one of two displays always will be visible. As the truck decelerates, the device rotates and a second display becomes visible. Similarly, when the truck again accelerates, the device will rotate and the first display will again be visible. This same change of displays will occur each time the truck stops, starts or goes down a hill.

Referring now to the drawings, wherein like numerals indicate similar parts, the disclosed form of the present invention includes generally, as elements thereof, an elongated rod member 10, a pair of spaced, disc elements 12 and 14, an inner, tubular body 16 and an outer, tubular body 18.

The elements 12—14 are rigidly attached to the member 10 adjacent each end thereof respectively by means of fasteners 20.

The inner, tubular body 16 is held in place, between the elements 12—14, by the engagement thereof with the discs 12—14 within annular grooves 22 provided therefor on the inner faces of the discs. The body 16 has a spiral slot 26 provided therein, there being a rectilinear length 28 at each end of the slot 26. It is noted that, in the body 16 illustrated in the drawing, there is an angular displacement of substantially 180° between lengths 28.

The outer, tubular body 18 also spans the distance between disc elements 12—14, in circumscribing relationship to the body 16 and rod member 10. A weighted ball 30, within body 18, is free to roll from end to end of the body 18 as limited by the engagement of ball 30 with the body 16 within slot 26, the latter serving as a race or way for ball 30. There is a resilient bumper 29 on the inner face of each of the discs 12—14 which is engaged by the ball 30 at each end of its path of travel.

Brackets 32 are provided for mounting opposed ends of rod member 10 on a vehicle 34, as shown in Fig. 1.

In operation, assuming the vehicle 34 to be in forward motion, sufficient momentum is imparted to the ball 30 to cause the latter to roll to the rear end of body 18. The force of gravity acting on ball 30 rotates the entire device, in brackets 32, to the position of Fig. 4. When the vehicle 34 is decelerated, there is a change of inertia in ball 30 which change imparts momentum to the ball 30 and causes movement thereof to the opposite end of body 18. As the ball rolls within the slot 26, the force of gravity acting thereon causes rotation of the entire device to the position illustrated in Fig. 3. Assuming, again, that the vehicle 34 is in forward motion, as indicated by the arrows in Figs. 3 and 4, it is manifest that, if the vehicle comes to a downwardly inclined slope, the device will rotate from the position of Fig. 4 to the position of Fig. 3, as ball 30 rolls within body 18. Each time the device rotates, the display on body 18 is alternated.

In the embodiment chosen for illustration, the race for ball 30 takes the form of spiral slot 26. Obviously, any structure which provides spirally disposed guides within the path of travel of ball 30 will suffice. If such equivalent structure is provided, it becomes apparent that so long as radial movement of ball 30 is substantially limited by such equivalent structure, the displays of Figs. 3 and 4 may be altered to suit the particular needs of the user. For example, a pair of flat panels could be substituted for the body 18.

Similarly, if a barber pole type display is desired, the angular displacement between the displays of Figs. 3 and 4 need not be substantially 180° but, rather, the angular displacement between lengths 28 of slot 26 may be lessened or increased as desired.

Referring now to Figs. 7–10, inclusive, there is illustracted a modified form of means for mounting the display device, in which rod member 10 is rotatably mounted at each end thereof in legs 52 and 54 of a U-shaped element 56 having also a bight 58. The bight 58 is suspended from a pair of L-shaped arms 60 and 62, the latter each having an extension 64 on the outermost end thereof which is pivotally attached to bight 58 through openings 66 therein. The upright portions of arms 60—62 are swingable in bosses 68 and 70 on a bracket 72, the latter being loosely mounted on a panel of automobile 34.

Viewing Figs. 8 and 10, it is to be noted that a pair of fasteners 74 and 76 are threaded into suitable openings in an automobile and held in place by locking nuts 78 and 80. Referring to Fig. 10, the fastener 76 passes through an opening 82 in bracket 72 which is substantially larger than fastener 76. Suitable washers 84 are provided between panel 34 and bracket 72 and between the latter and a head 86 on fastener 76. In this manner, limited relative movement is provided between bracket 72 and the panel 34.

When the mounting means of Figs. 7-10 is placed in use, a change of inertia in panel 34 causes swinging movement of bight 58, as illustrated by the dotted lines of Fig. 8. Such swinging movement imparts momentum to ball 30 to rotate tubular bodies 16 and 18. Furthermore, by virtue of the relative movement provided between bracket 72 and panel 34, bracket 72 usually moves relative to the automobile each time the latter passes over an obstruction in the road. Such relative movement also causes swinging of the arms 60—62 and rotation of tubular bodies 16—18 and the display thereon. Manifestly, such a mounting means is well adapted for use either on a side panel or on the rear of automobile 34.

It is obvious that the embodiment herein disclosed is a preferred form only and that many changes or modifications may be made therein without departing from the broad principles of the present invention. Such changes or modifications are contemplated hereby and it is, therefore, desired to be limited only by the scope of the apppended claim.

Having thus described the invention, what is claimed as new and desired to be secured by Letters Patent is:

An advertising display device adapted for use on automobiles and the like, said device comprising a substantially U-shaped bracket having an elongated, horizontal bight and a pair of parallel, vertical legs at each end thereof; a tubular member rotatably mounted on the legs in a horizontal position and spanning the distance therebetween; a tubular body within, spaced from, and extending the length of the member, the longitudinal axes of the member and the body being coincidental, said body being provided with a spiral slot extending from end to end thereof; a metallic ball reciprocable in said slot between the member and said body when momentum is imparted thereto by movement of the member, the weight of the ball being sufficient to rotate the member through the angular displacement of said slot as the ball reciprocates; a pair of spaced, substantially L-shaped arms, each having a vertical portion and a horizontal portion; means pivotally mounting said vertical legs on the side of the automobile in a manner so as to be rotatable on parallel vertical axes; and means pivotally attaching the outermost ends of the horizontal legs to said bracket so as to be rotatable on vertical axes, said horizontal legs being disposed in parallel relationship whereby the bracket and member thereon remain parallel to said side of the automobile as the same swings with respect thereto.

References Cited in the file of this patent

UNITED STATES PATENTS

| | | |
|---|---|---|
| 726,702 | Knoblich | Apr. 28, 1903 |
| 770,931 | Seary et al. | Sept. 27, 1904 |
| 1,194,853 | McCarmack | Aug. 15, 1916 |
| 1,665,894 | Reichard | Apr. 10, 1928 |

FOREIGN PATENTS

| | | |
|---|---|---|
| 17,713 | Great Britain | of 1910 |